United States Patent
Lin

(10) Patent No.: US 10,393,442 B2
(45) Date of Patent: Aug. 27, 2019

(54) VENTILATION AND NOISE REDUCTION SYSTEM FOR CENTRALIZED COOLING TOWER

(71) Applicant: XIAMEN JIADA ENVIRONMENTAL PROTECTION TECHNOLOGY CO., LTD, Xiamen, Fujian (CN)

(72) Inventor: Jiaxiang Lin, Xiamen (CN)

(73) Assignee: XIAMEN JIADA ENVIROMENTAL PROTECTION TECHNOLOGY CO., LTD, Xiamen, Fujian (CN)

( * ) Notice: Subject to any disclaimer, the term of this patent is extended or adjusted under 35 U.S.C. 154(b) by 188 days.

(21) Appl. No.: 15/462,786

(22) Filed: Mar. 17, 2017

(65) Prior Publication Data
US 2017/0268824 A1    Sep. 21, 2017

(30) Foreign Application Priority Data
Mar. 18, 2016    (CN) .......................... 2016 1 0155087

(51) Int. Cl.
| | |
|---|---|
| F28C 1/10 | (2006.01) |
| E04B 1/82 | (2006.01) |
| E04H 5/02 | (2006.01) |
| F04D 29/52 | (2006.01) |
| F04D 29/66 | (2006.01) |
| F28C 1/00 | (2006.01) |
| F28F 25/10 | (2006.01) |

(52) U.S. Cl.
CPC ................. *F28C 1/10* (2013.01); *E04B 1/82* (2013.01); *E04H 5/02* (2013.01); *F04D 29/522* (2013.01); *F04D 29/664* (2013.01); *F28C 1/003* (2013.01); *F28F 25/10* (2013.01); *E04B 1/8218* (2013.01); *F28C 2001/006* (2013.01)

(58) Field of Classification Search
CPC ....... E04H 5/12; F04D 29/522; F04D 29/664; F28C 1/10; F28C 1/003; F28C 2001/006; E04B 1/82
USPC .......................................................... 181/224
See application file for complete search history.

(56) References Cited

U.S. PATENT DOCUMENTS

| | | | | |
|---|---|---|---|---|
| 4,328,176 A * | 5/1982 | Alt | ............................ | F28C 1/10 261/111 |
| 6,374,944 B1 * | 4/2002 | Curl, Jr. | ................... | F01D 25/30 181/222 |
| 6,497,401 B2 * | 12/2002 | Flaherty | ..................... | F28C 1/00 261/109 |
| 6,880,813 B2 * | 4/2005 | Yazici | ........................ | F28C 1/10 181/224 |
| 6,942,200 B2 * | 9/2005 | Gu | ............................ | F28C 1/04 165/122 |

(Continued)

*Primary Examiner* — Jeremy A Luks
(74) *Attorney, Agent, or Firm* — Raymond Y. Chan; David and Raymond Patent Fimr

(57) ABSTRACT

A ventilation and noise reduction system for centralized cooling towers includes a wind outlet sound-reduction structure, a wind inlet sound-reduction channel, a rainwater collection system, and an arrestor device; wherein the integrated sound-absorbing and sound-insulation shed includes a loading-bearing installation structure for a lifting ring, a concrete foundation, a bearing support structure, a ceiling installation structure, a sound-insulation structure and a lighting and sound-insulation structure.

17 Claims, 7 Drawing Sheets

(56) References Cited

U.S. PATENT DOCUMENTS

| | | | |
|---|---|---|---|
| 7,111,831 B2* | 9/2006 | Hentschel | F28C 1/10 |
| | | | 181/224 |
| 7,802,774 B2* | 9/2010 | Facius | F28C 1/14 |
| | | | 261/119.1 |
| 9,587,893 B2* | 3/2017 | Bogh | E04H 5/12 |
| 2018/0172367 A1* | 6/2018 | Shin | F28C 1/12 |

* cited by examiner

VENTILATION AND NOISE REDUCTION SYSTEM FOR CENTRALIZED COOLING TOWER

CROSS REFERENCE OF RELATED APPLICATION

This is a regular application that claims priority to China non-provisional application, application number CN2016101550879, filed Mar. 18, 2016, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

This invention related to a technology field of noise control, and more especially to a kind of ventilation & noise reduction system for centralized cooling tower, which can eliminate the airborne noise transmission of the cooling tower with multiple centralized arrangements.

Description of Related Arts

In recent years, there are more and more large-scale commercial complexes which are multiple cooling towers centrally arranged to form a centralized cooling tower area. Superimposed noise produced during the running process of multiple cooling towers may have a greater impact on around airborne environment. As the cooling towers are set together, if acoustic shields, air inlet muffler, air outlet muffler, and maintenance channels are separately set up with each individual cooling tower, the gap among the cooling towers will be very small and the pipelines will cross with each other, which is cumbersome for the maintenance of cooling towers. If each cooling tower is set up separately, it will disturb hot and cold airflow directions so that the produced outlet hot air and inlet cold air will be influenced by each other, and further the thermal performance of the cooling tower will be influenced also.

SUMMARY OF THE PRESENT INVENTION

The invention is advantageous in that it provides ventilation & noise reduction system applied to centralized cooling towers, which consists of an integrated sound-absorbing and insulation shed, a wind outlet sound-insulation structure, a wind inlet sound-insulation channel, a maintenance channel, a rainwater collection system and a lightning protection device; the related integrated sound-absorbing and sound-insulation shed including a loading-bearing installation structure (including concrete waterproof foundation, a bearing support structure, a ceiling installation structure and a lifting ring), a sound-absorbing and sound-insulation structure and a lighting and sound-insulation structure.

The above-mentioned wind outlet sound-absorbing structure is constituted by a detachable sealed sound insulation and sound-absorbing structure (between the top of the fan of the cooling tower and the ceiling installation structure), a resistive chip muffler (on the ceiling installation structure), and a rainproof sound-absorbing hood (set up on the resistive chip muffler). The rainproof sound-insulation hood is constituted by a top cap umbrella, a sound-absorbing diversion cone in a middle part of the cap umbrella, a surrounding sound-absorbing board on an inner side of a cap of the umbrella and an installation load-bearing structure. A muffler expanding area is formed by a cavity of the sealed sound-absorbing structure that is formed between the top of the fan of the cooling tower and the resistive chip muffler. This muffler expanding area is defined as an "expanding sound-absorbing room". Meanwhile, after the helical outlet wind is alleviated by the sound-absorbing area, an uniform and stable outlet wind is generated to enter the resistive sound-absorbing chip of outlet mouth. After the uniform and stable outlet wind is passing through the resistive sound-absorbing chip, it goes into the rainproof sound-absorbing hood. The sound wave generated from the uniform and stable outlet wind is further absorbed by the sound-absorbing diversion cone. As a top end area of the sound-absorbing area of the sound-absorbing diversion cone is small, an acoustic impedance of the sound-absorbing diversion cone gradually increases from the impedance which is similar with air impedance characteristics to the impedance that is similar to cellular material impedance. The impedance gradually increases with non-significantly changed. Hence, when the sound wave enters from the top end of the sound-absorbing hood, the acoustic impedance of material and acoustic impedance of air can effectively match with each other based on the gradual transition of the sound-absorbing layer, such that most of the incoming sound waves can enter into and be effectively absorbed by the material. Therefore, the sound waves have a broadband sound absorption property.

The rainproof sound-absorbing hoods are arranged as a whole arrangement. Sound-absorbing boards are arranged on the upper part of the resistive chip mufflers which separate the wind outlets of cooling towers, so as to prevent the short circuit generated from the wind outlets between the opened cooling towers and the closed cooling towers. Therefore, the thermal properties of the cooling tower are improved.

The above-mentioned wind inlet sound-absorbing channel is constituted by a pendent two-sided sound absorber installed aside the eaves of integrated sound-absorbing shed and a sound-absorbing barrier installed on a ground waterproof wall. An observing lighting sound-insulation structure is arranged on intervals on the sound barrier, and an impedance recombination sound-absorbing structure is formed. The sound barrier is installed on ground waterproof wall to guarantee that the sound barrier's bottom will not be eroded by the rainwater. Because the arrangement of the ventilation & noise reduction system for the centralized cooling tower, the running noise generated from the cooling towers are shielded, so the repairman cannot understand the running condition of the cooling tower through based on the running noise. Therefore, the observing lighting sound-insulation structure is helpful for the repairman to externally observe the running condition of the cooling tower. The structure of the observing lighting sound-insulation is the same as that of the lighting sound-insulation.

The above-mentioned maintenance channel is arranged at the middle part of the sound barrier of the wind inlet sound-attenuation channel. An L-type sound barrier is arranged outside the maintenance channel. The maintenance channel is defined as an access foe the repairman. The L-type sound barrier arranged outside the maintenance channel is adapted to prevent the sound wave being spread to outside through the maintenance channel. Since the ventilation & noise reduction system for centralized cooling tower is arranged in outdoor, an ordinary maintenance sound-absorbing door is arranged on the sound barrier. In addition, sealing rubber strips and door closers for maintain the sound-absorbing door are easy to be damaged in outdoor conditions, so the arrangement of the maintenance channel provides a better weather resistance than that of the maintenance sound-absorbing door. Therefore, the maintenance channel not only meets the sound-absorbing requirements, but also is easy for allowing repairman and repairmen tools entering therein, so as to reduce maintenance costs The overall height of the above-mentioned integrated sound-absorbing and sound-insulation shed is higher than that of the highest cooling tower. Gaps between the sound-absorbing and sound-insulation structure, lighting sound-insulation structure, and resistive chip muffler are sealed by glue. The lighting sound-insulation sound-absorbing structure is arranged on higher height of the integrated sound-absorbing and sound-insulation shed to guarantee the lightning of the cooling tower area, which is helpful for patrols and maintenances for the repairman.

All the outlet wind of cooling towers enters into the wind outlet sound-absorbing structure through fan inlet & outlet wind reduction structure. After the sound is absorbed by the wind outlet sound-attenuation structure, the hot-gas is discharged outside. All inlet wind of the cooling tower passes through the pendent two-side sound absorber arranged aside the surrounding of the eaves of the integrated sound-absorbing and sound-insulation shed. The wind inlet sound-attenuation channel of the sound barrier installed on ground waterproof wall is adapted to send the cooling air to the cooling tower area, and then the cooling air is entered into the heat exchange area in bottom of the cooling towers. The effective area of wind inlet sound-attenuation channel is not smaller than heat exchange areas of all cooling towers. The flow speed of inlet wind is slow, which can efficiently reduce the loss of the air flow pressure. The arrangement of the wind inlets and outlets is helpful for improving the thermal performance of the cooling towers. Because all cooling towers are arranged in one big sound-absorbing and sound-insulation shed, the wind resistance of ventilation in the big shed is small, and it is helpful for the ventilation and heat dissipation.

The above-mentioned rainwater collection system comprises a double water pouring ceiling of an integrated sound-absorbing and sound-insulation shed, eave gutters and drain pipes arranged on the eave. The drain pipe guides the rainwater into an original drainage ditch. The above-mentioned arrester device is installed on the upper part of the middle part of the integrated sound-absorbing and sound-insulation shed and is at a position higher than a lightning conductor arranged on a top end of the rainproof sound-absorbing hood, with ground-connected electrodes through leading wires.

The lifting ring is arranged on the double water pouring ceiling of the integrated sound-absorbing and sound-insulation shed. The load of the lifting ring is bigger than a gravity load of the single cooling tower to satisfy the lifting requirement during maintenance.

The wind inlet and outlet routes of this ventilation & noise reduction system comprises following step: fresh air on the ground surrounding the integrated sound-absorbing and sound-insulation shed→wind inlet sound-attenuation channel (sound absorbed by sound-absorbing barriers and two-side arranged sound absorbers)→an interior of the sound-absorbing and sound-insulation shed→wind inlets of the cooling towers→heat exchange in the cooling tower→wind outlets of the cooling towers→sound-absorbing pipes (sound-elimination with space-expansion, and steady flow-→wind-outlet mufflers (sound-attenuation)→rainproof sound-attenuation sound-absorbing hood (rainproof, sound-insulation and wind outlets)→discharge to the space on upper part of the integrated sound-absorbing and sound-insulation shed.

The working principle of this invention is: the individual arrangement between the wind inlet and outlet are helpful for improving the thermal performance of the cooling towers. The effective areas of sound-absorbing inlets and outlets are not smaller than the heat exchanging area of all cooling towers. The flow speed of inlet wind is slow, which greatly reduces the loss of the air flow pressure. Because all cooling towers are arranged in one big sound-absorbing and sound-insulation shed, so the wind resistance in the big space is small and it is helpful for the ventilation and heat dissipation.

Comparing with the existing technology, the profitable effects of this invention are:

1. The individual arranged wind inlets and outlets are helpful for improving heat exchanging performance of cooling towers;

2. The flow speed of inlet wind is slow, which greatly reduces the loss of the air flow pressure;

3. It is helpful for the maintenance of sound-attenuation system and cooling tower;

4. The rainwater collection system and the lightening protection device are arranged to guarantee the weather-resistance ability for long-term usage; and 5. The cost for the arrangement of present invention is much lower than that the cost of a single muffler device being arranged on each of the single cooling tower, and a better overall landscape effects are achieved at the same time.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
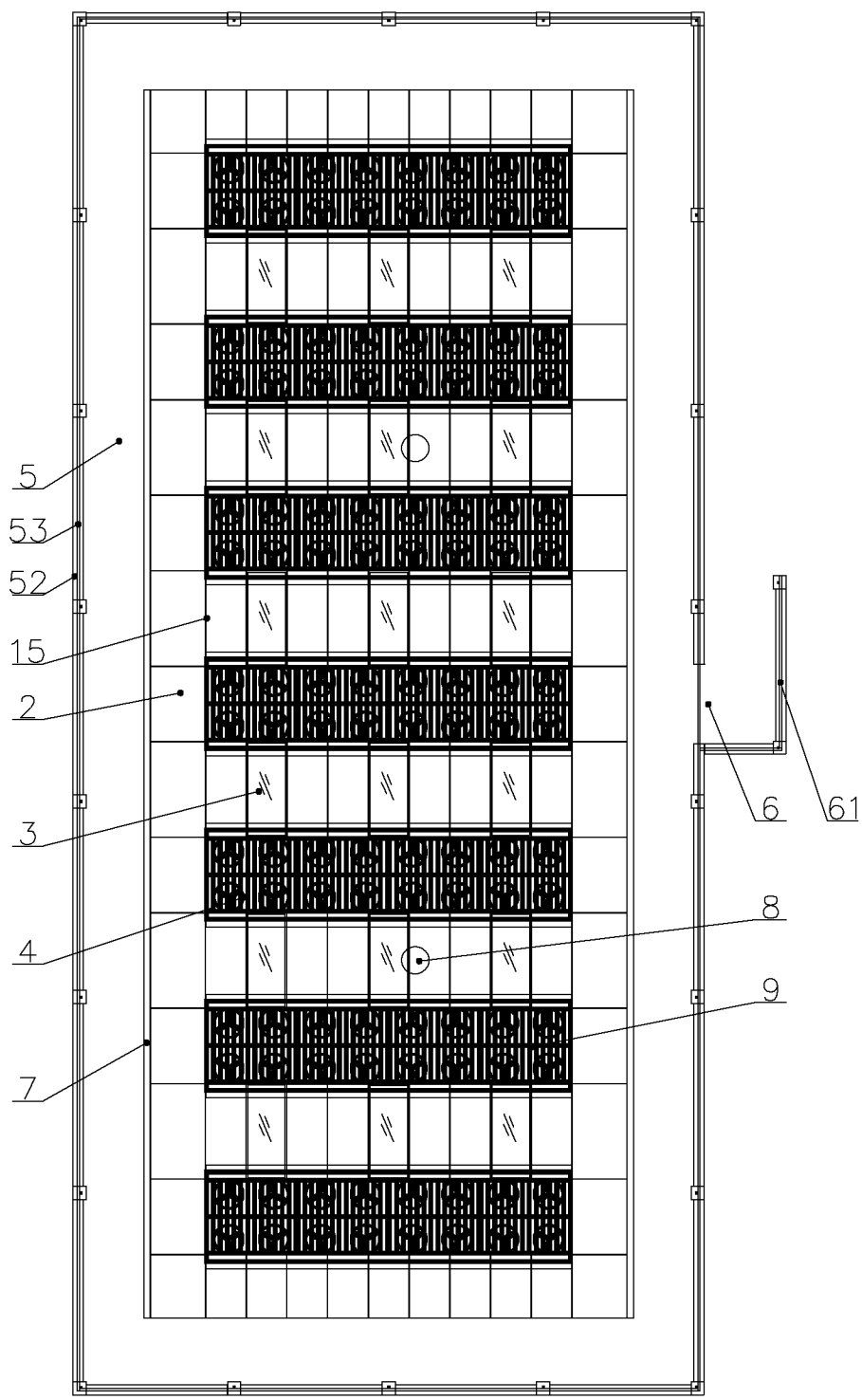
FIG. 1 is a perspective view of a ventilation and noise reduction system for centralized cooling tower according to a preferred embodiment of the present invention.
Figure 2:
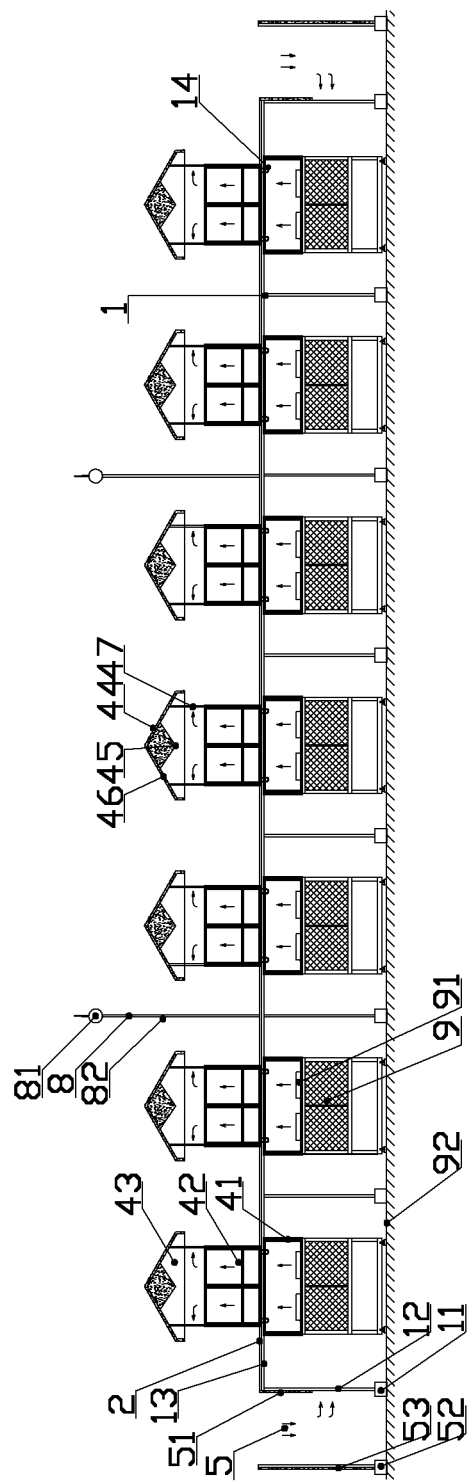
FIG. 2 is a side view of the ventilation and noise reduction system for centralized cooling tower according to the above mentioned preferred embodiment of the present invention.

Referring to FIG. 1 and FIG. 2 of the drawings, a ventilation and noise reduction system for centralized cooling towers according to a preferred embodiment of the present invention is illustrated, wherein the ventilation and noise reduction system comprises an integrated sound-absorbing and sound-insulation shed, a wind outlet sound-attenuation structure 4, a wind inlet sound-attenuation sound-absorbing channel 5, a rainwater collection system 7, and an arrestor device 8; the above-mentioned integrated sound-absorbing and sound-insulation shed comprises a loading-bearing installation structure 1 for a lifting ring 14, a concrete foundation 11, a bearing support structure 12, a ceiling installation structure 13, a sound-insulation structure 2 and a lighting and sound-insulation structure 3.

Figure 3:
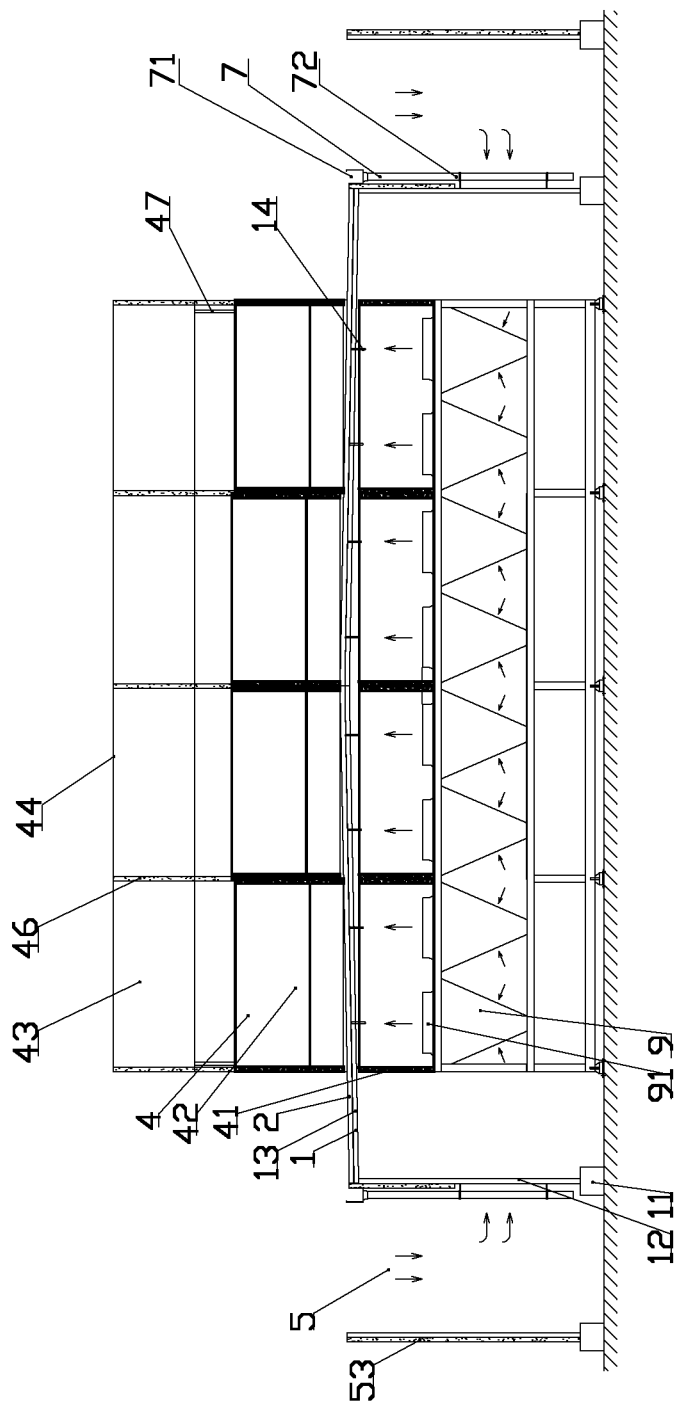
FIG. 3 is a side view of a wind outlet sound-attenuation structure of the ventilation and noise reduction system according to the above mentioned preferred embodiment of the present invention.
Figure 4:
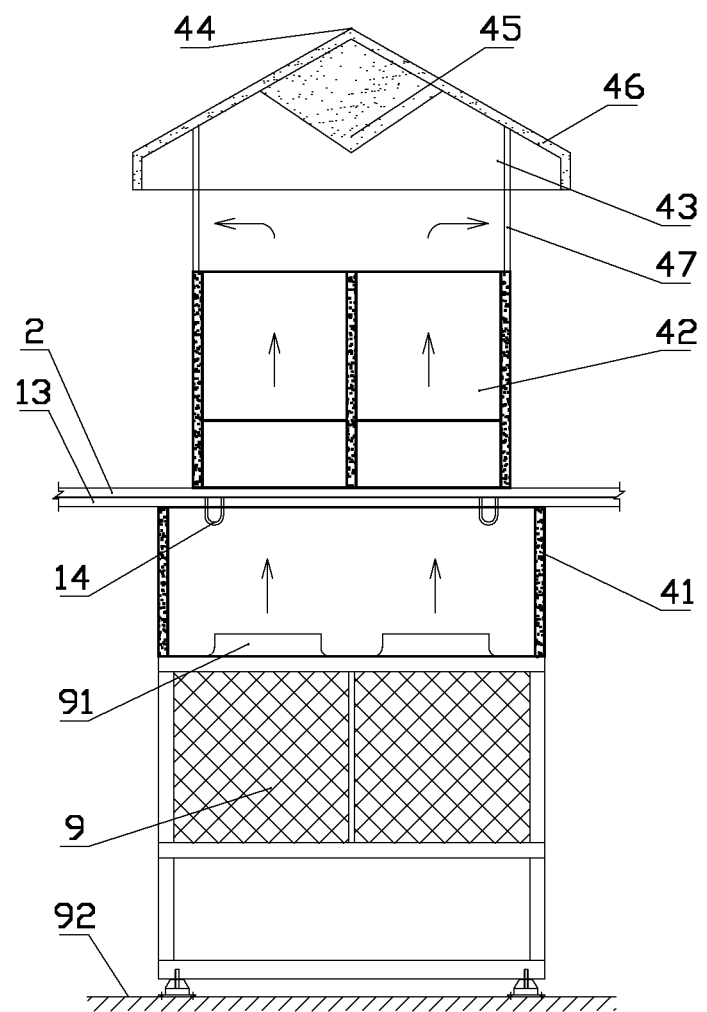
FIG. 4 is a sectional view of a wind outlet sound-attenuation sound-absorbing channel of the ventilation and noise reduction system according to the above mentioned preferred embodiment of the present invention.

Referring to FIG. 3 and FIG. 4 of the drawings, the wind outlet sound-attenuation structure 4 comprises a detachable sealed sound insulation and sound-absorbing structure 41 arranged between a top portion of a fan wind outlet 91 of a cooling tower 9 and the ceiling installation structure 13, a resistive chip muffler 42 arranged on the ceiling installation structure 13, and a rainproof sound-attenuation hood 43 on the resistive chip muffler 42. The rainproof sound-attenuation hood 43 comprises umbrella cap 44, a sound-absorbing diversion cone 45 arranged in a middle portion of the umbrella cap 44, a sound-absorbing board 46 arranged in the umbrella cap 44 and an installation load-bearing structure 47; the rainproof sound-attenuation hood 43 is arranged in a relative overall arrangement. Gaps are naturally formed between an upper portion of the sound-absorbing board 46 and the resistive chip mufflers 42.

Figure 5:
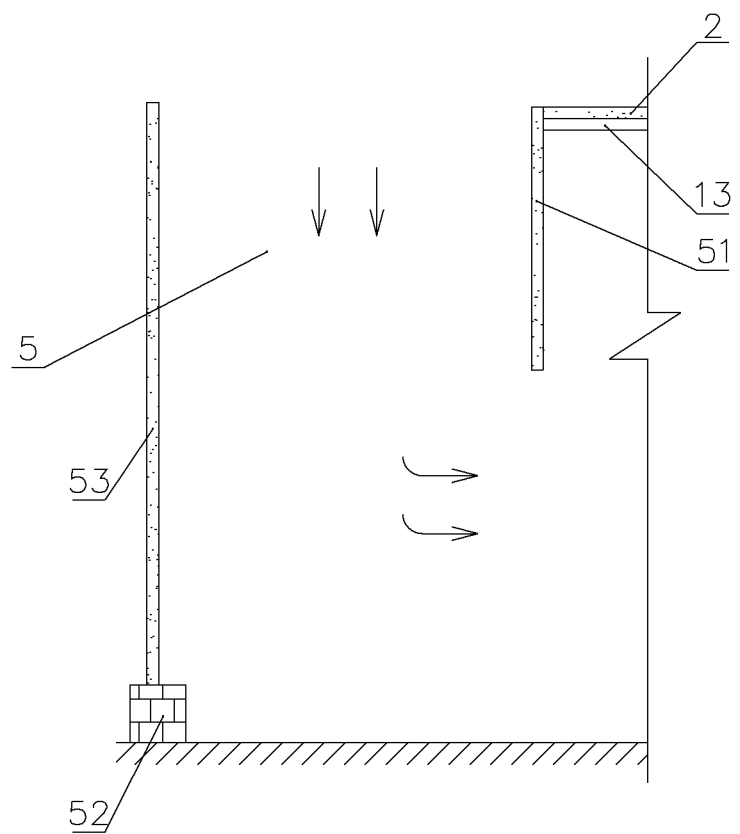
FIG. 5 is a sectional view of a wind inlet sound-attenuation channel of the ventilation and noise reduction system according to the above mentioned preferred embodiment of the present invention.

Referring to FIG. 5 of the drawings, the wind inlet sound-attenuation channel 5 comprises a pendent two-side sound absorber 51 arranged aside a eaves of the integrated sound-absorbing and sound-insulation shed and a sound barrier 53 arranged on a waterproof wall 52 on a ground 92. The wind inlet sound-attenuation channel 5 further comprises a plurality of observing lighting sound-insulation structures 54 spacedly arranged at on the sound barrier 53.

Figure 6:
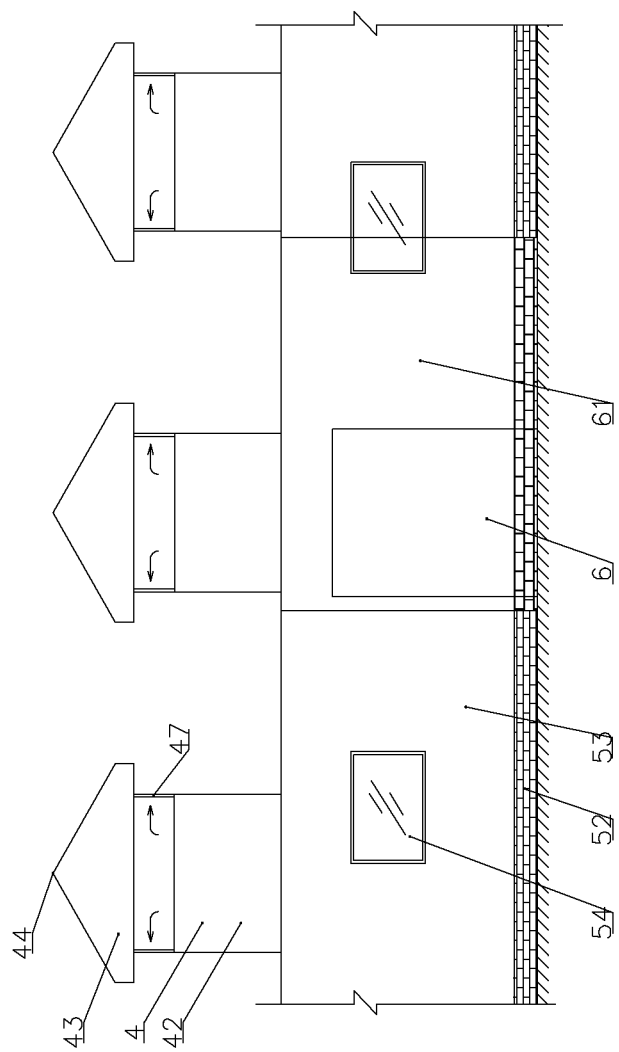
FIG. 6 is a perspective view of a maintenance channel of the ventilation and noise reduction system according to the above mentioned preferred embodiment of the present invention.
Figure 7:
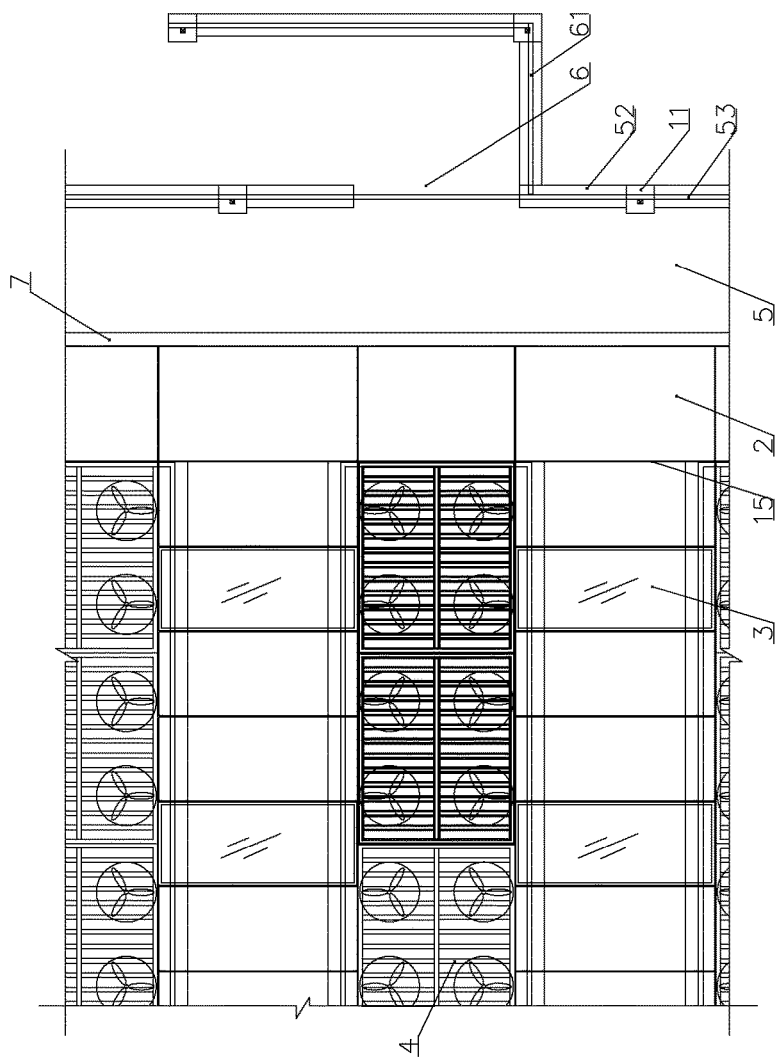
FIG. 7 is a top view of the maintenance channel of the ventilation and noise reduction system according to the above mentioned preferred embodiment of the present invention.

Referring to FIG. 6 and FIG. 7 of the drawings, the ventilation and noise reduction system further comprises a maintenance channel 6 arranged in a middle portion of the sound barrier 53 of the wind inlet sound-attenuation channel 5, and a L-shaped sound barrier 61 arranged outside the maintenance channel 6.

The rainwater collection system 7 comprises a double water pouring ceiling of the integrated sound-absorbing and sound-insulation shed, eave gutters 71, and drainage pipe 72 arranged on an eave to guide the rainwater into the original drainage ditch.

The arrestor device 8 is arranged on a top end of a middle portion of the integrated sound-absorbing and sound-insulation shed, wherein the arrestor device 8 comprises a plurality of lightning rods 81 arranged at a position higher than that of the rainproof sound-attenuation hood 43. The lightning rods 81 are connected with a ground through leading wires 82.

The lifting ring 14 is arranged on the ceiling installation structure 13, wherein the rated load of the lifting ring 14 is larger than a gravity load of a single cooling tower 9.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A ventilation and noise reduction system for centralized cooling towers each having a wind outlet, comprising:
    an integrated sound-absorbing and sound-insulation shed which comprises a concrete foundation and a ceiling structure supported by said concrete foundation for positioning above the cooling towers;
    a wind outlet sound-reduction structure which comprises a detachable sealed sound insulation and sound-absorbing structure arranged for supporting above the wind outlets of the cooling towers for absorbing sound from the wind outlets of the cooling towers, a resistive chip muffler positioned on said detachable sealed sound insulation and sound-absorbing structure for muffling the sound from the wind outlets of the cooling towers, and a rainproof sound-attenuation hood positioned on said resistive chip muffler for attenuating the sound from the wind outlets of the cooling towers and for sheltering rain; and
    a wind inlet sound-reduction structure which comprises a pendent two-side sound absorber extended at each eave of said ceiling structure of said integrated sound-absorbing and sound-insulation shed, a waterproof wall arranged for being formed on a ground, and a sound barrier upwardly extended from said waterproof wall to form a wind inlet sound-reduction channel between said pendent two-side sound absorber and said sound barrier.

2. The ventilation and noise reduction system, as recited in claim 1, wherein said rainproof sound-reduction hood comprises an umbrella cap positioned on said resistive chip muffler, a sound-absorbing diversion cone arranged in a middle portion of said umbrella cap, and a sound-absorbing board arranged in said umbrella cap.

3. The ventilation and noise reduction system, as recited in claim 2, wherein said umbrella cap, said sound-absorbing diversion cone and said sound-absorbing board are formed in an integrity structure.

4. The ventilation and noise reduction system, as recited in claim 1, wherein said wind inlet sound-reduction structure further comprises a plurality of observing lighting sound-insulation structures spacedly formed on said sound barrier for light passing therethrough.

5. The ventilation and noise reduction system, as recited in claim 2, wherein said wind inlet sound-reduction structure further comprises a plurality of observing lighting sound-insulation structures spacedly formed on said sound barrier for light passing therethrough.

6. The ventilation and noise reduction system, as recited in claim 1, further comprising a rainwater collection system which comprises a plurality of eave gutters extended from said ceiling structure and a plurality of drainage pipes communicating with said eave gutters for guiding rainwater from said eave gutters.

7. The ventilation and noise reduction system, as recited in claim 2, further comprising a rainwater collection system which comprises a plurality of eave gutters extended from said ceiling structure and a plurality of drainage pipes communicating with said eave gutters for guiding rainwater from said eave gutters.

8. The ventilation and noise reduction system, as recited in claim 5, further comprising a rainwater collection system which comprises a plurality of eave gutters extended from said ceiling structure and a plurality of drainage pipes communicating with said eave gutters for guiding rainwater from said eave gutters.

9. The ventilation and noise reduction system, as recited in claim 1, further comprising an arrestor device arranged on a top end of a middle portion of said integrated sound-absorbing and sound-insulation shed, and a plurality of lightning rods arranged at a position higher than said rainproof sound-attenuation hood.

10. The ventilation and noise reduction system, as recited in claim 5, further comprising an arrestor device arranged on a top end of a middle portion of said integrated sound-absorbing and sound-insulation shed, and a plurality of lightning rods arranged at a position higher than said rainproof sound-attenuation hood.

11. The ventilation and noise reduction system, as recited in claim 8, further comprising an arrestor device arranged on a top end of a middle portion of said integrated sound-absorbing and sound-insulation shed, and a plurality of lightning rods arranged at a position higher than said rainproof sound-attenuation hood.

12. The ventilation and noise reduction system, as recited in claim 9, wherein said arrestor device further comprises a plurality of ground through leading wires electrically connected to said lightning rods.

13. The ventilation and noise reduction system, as recited in claim 10, wherein said arrestor device further comprises a plurality of ground through leading wires electrically connected to said lightning rods.

14. The ventilation and noise reduction system, as recited in claim 11, wherein said arrestor device further comprises a plurality of ground through leading wires electrically connected to said lightning rods.

15. The ventilation and noise reduction system, as recited in claim 1, further comprising a maintenance channel arranged in a middle portion of said sound barrier, and a L-shaped sound barrier arranged outside said maintenance channel.

16. The ventilation and noise reduction system, as recited in claim 5, further comprising a maintenance channel arranged in a middle portion of said sound barrier, and a L-shaped sound barrier arranged outside said maintenance channel.

17. The ventilation and noise reduction system, as recited in claim 14, further comprising a maintenance channel arranged in a middle portion of said sound barrier, and a L-shaped sound barrier arranged outside said maintenance channel.

\* \* \* \* \*